April 15, 1941.　　　　H. P. FELL　　　　2,238,690
APPARATUS FOR PURIFYING CASEIN
Filed Nov. 6, 1939　　　　2 Sheets-Sheet 2
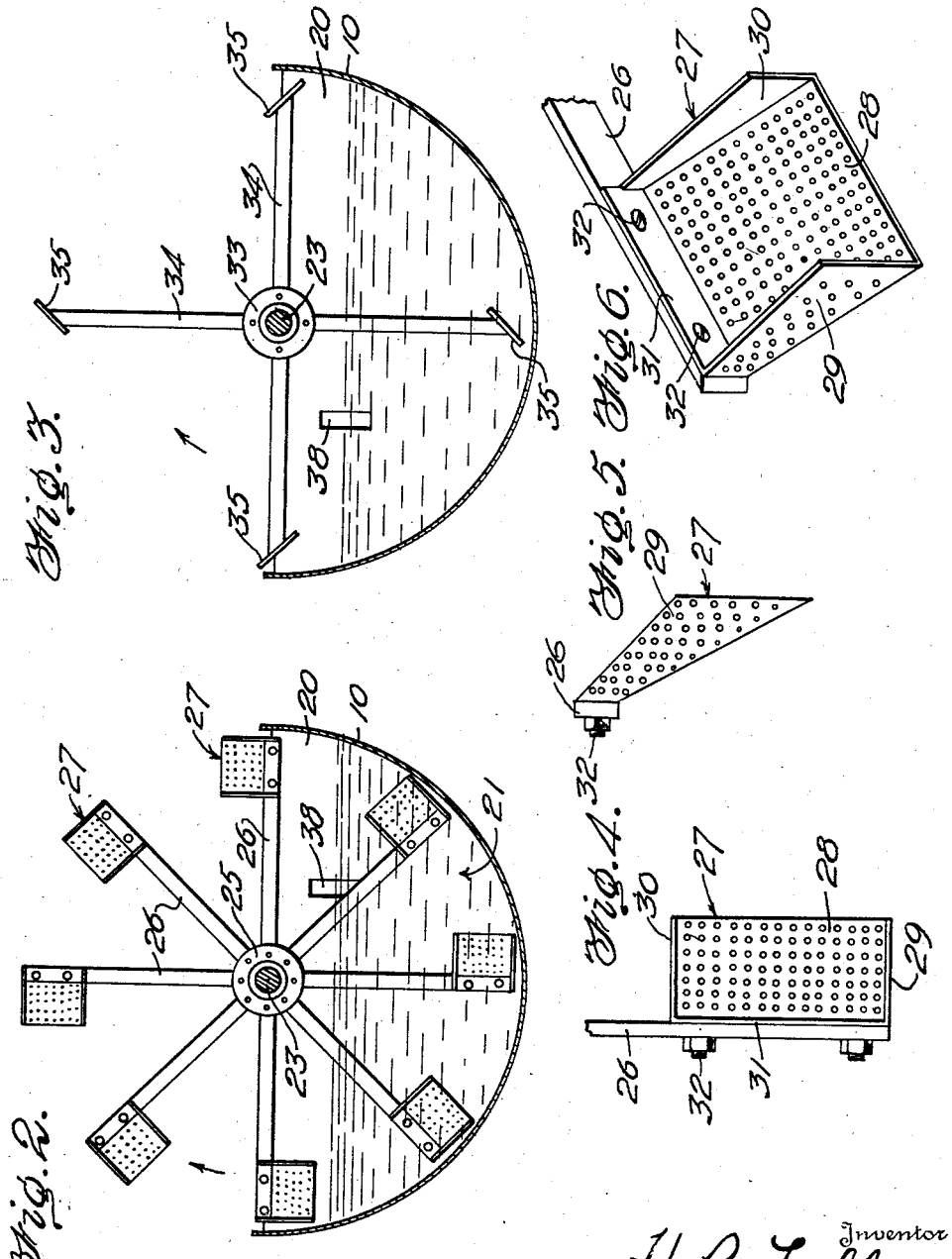

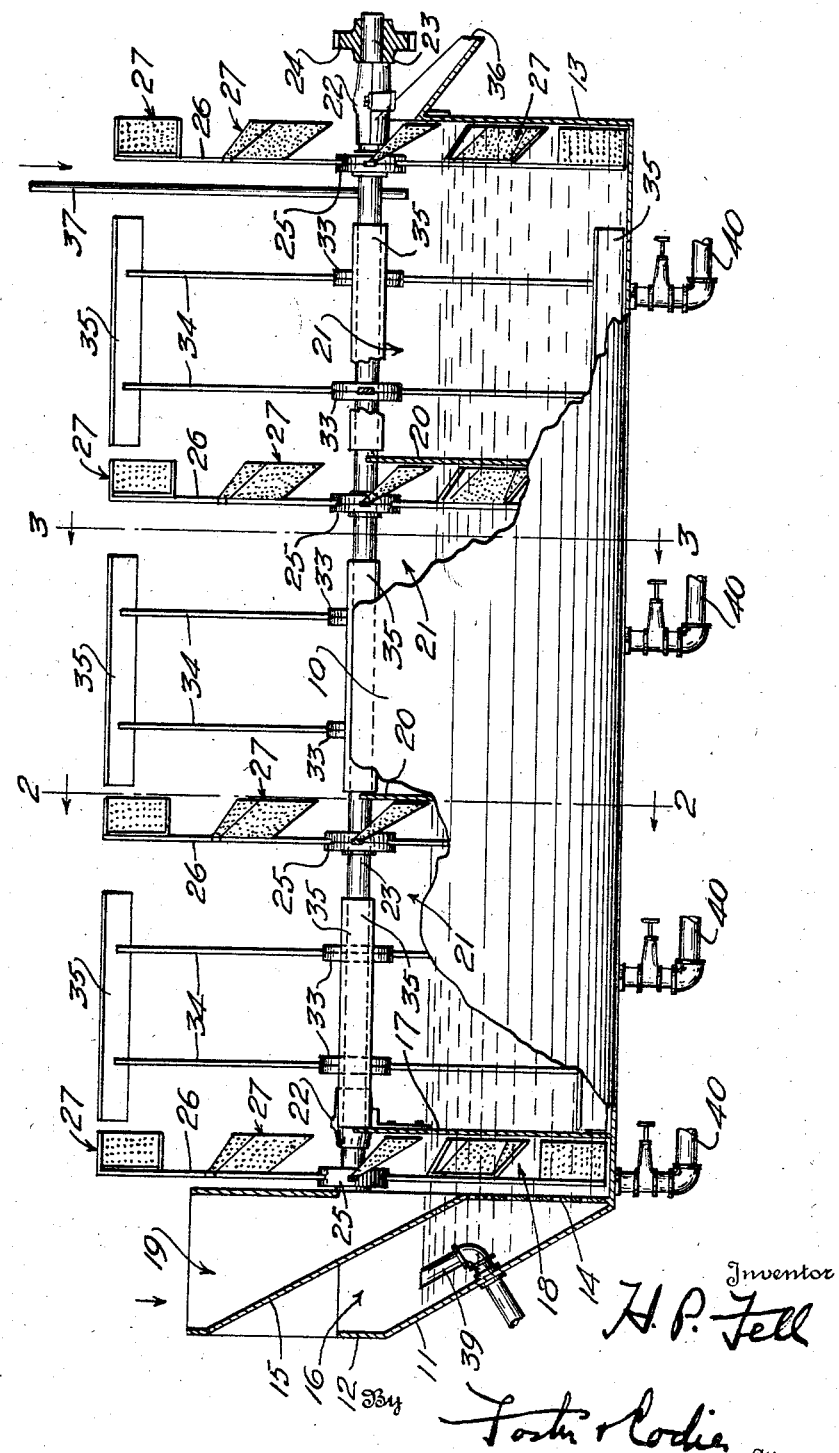

Patented Apr. 15, 1941

2,238,690

UNITED STATES PATENT OFFICE 2,238,690

APPARATUS FOR PURIFYING CASEIN

Hugh Parrish Fell, New York, N. Y.

Application November 6, 1939, Serial No. 303,160

6 Claims. (Cl. 141—1)

For a long time, much of the commercial casein made in the United States has been made in small creameries where it is not readily possible to carefully control the process, and where it is not considered feasible to properly wash the casein. In these creameries, the skim milk is usually first warmed up more or less, and an acid is added to the said skim milk, or a sour whey is added, and further amounts of acid are allowed to develop in the mixture, to produce the necessary acidity for causing coagulation of the major part at least of the casein. It is usual to then draw off the whey and to give the casein one or more washes with water, and thereafter to heat up the mixture of water and the casein to about 180° to 190° F. By this treatment the casein is "cooked" which causes the casein to mat together in a soft solid somewhat rubbery mass. The remaining water is then allowed to drain off, and the mass of casein is cut up with shovels or the like and put into receptacles for shipment to the central drying plant. The step of putting the casein into barrels or similar receptacles is usually conducted while the casein is still hot, say at 160° F. or higher, in which condition the casein mats together into a solid cheesy mass. When this cools, in the receptacles, it is much harder and is relatively tough and rubbery, and in ordinary practice this cake of casein contains substantial amounts of the acid and of the milk sugar, for the reason that these small creameries do not ordinarily have available a sufficient amount of water for thoroughly washing the casein, and they do not ordinarily have sufficient workmen to thoroughly accomplish this. As a result, when the tough cakes of casein are subsequently comminuted and run through a drier, as has heretofore been the usual practice, the product is non-uniform, and the product from day to day varies a good deal in its properties such as solubility in dilute alkalies, viscosity and other properties of the casein solution in alkalies, amount of alkali necessary to produce solution of the casein, and other factors. Much of the casein is of a decidedly varying quality, and I believe that this fact is largely due to the ineffective manner in which the casein is made and washed at these small creameries.

It should be borne in mind that very many of the small creameries could not install drying equipment, and the cakes of solid cooked casein prepared as above indicated, can be kept in that condition for a week or more, and in cool weather up to two or three weeks without producing substantial injury to the casein. It is accordingly entirely feasible to ship the cooked casein, in the condition indicated, to a central drying plant.

On arriving at the central drying plant, the cakes of casein are cut up and subjected to a thorough washing operation, by the method described herein, after which the casein is dried. It will be understood that cooked casein, as received at the drying plant never has been dried, and this material usually contains around 50 to 60% of water.

An object of the present invention is accordingly a process of washing cooked casein, in order to thoroughly remove the acids and the soluble material therefrom, and to accomplish this result in a completely safe and uniform manner, and with a minimum of water, power and the like.

Further objects of the invention are to provide a novel form of washing machine of the counterflow type wherein the material to be washed in a comminuted state, is carried through a succession of washing compartments while leaving the washing liquid drained from the material prior to its introduction to each succeeding compartment; to provide a novel means for so drawing the liquid from the material under treatment; to provide for delivering the washed material from the washer in a drained condition; and to provide a counterflow arrangement of novel construction whereby to prevent the more soiled bodies of water from flowing into the cleaner bodies of water in the machine.

With these and other objects in view the mechanical features of the invention consist of certain novel details of construction and combinations of parts which will presently be particularly described and which are illustrated in the accompanying drawings.

In the accompanying drawings like characters of reference indicate like parts in the several views, and:

Figure 1 is a side elevation of one embodiment of the washing machine of the invention with certain parts broken away in order to show the interior of the washer.

Figure 2 is a section on the line 2—2 of Figure 1, but with the stirring or beating element omitted.

Figure 3 is a section on the line 3—3 of Figure 1, but with the draining elements omitted.

Figure 4 is a plan view of one of the draining buckets, shown with its arm horizontal, and with a part of its supporting arm attached.

Figure 5 is an outer side view of the parts shown in Figure 4.

Figure 6 is a perspective view of the parts shown in Figure 4.

In the construction of this washing machine there is provided a body of generally semi-cylindrical or trough-like form having a side and bottom wall 10 of slightly greater extent than 180° in cross-section. At one end, preferably toward the charging end, this body is closed by an inclined wall 11 and a vertical wall 12 extending upwardly from the upper edge of the wall 11. The other end of the body is closed by a vertical wall 13, this end being termed the delivery end. Extending vertically from the point where the bottom of wall 11 intersects the bottom of the wall 10 is a perforated plate 14, the perforations of this plate being of a sufficiently small size to prevent passage of such finely divided casein as may become suspensed in the wash water. A charging chute has an end 15 extending at an outwardly inclined direction from the top of the screen plate 14. The plate 14 and end 15 thus divide the body of the washer so that an overflow chamber 16 is formed at the charging end of the machine.

Spaced from the plate 14 is a partition plate 17 and the space between the plates 14 and 17 forms a charge receiving well 18 into which the casein fed into the charging chute 19 falls. Other semi-circular partitions 20 divide the body of the washer into a series of washing compartments 21. As here shown there are three compartments 21 but this number may be varied to suit the conditions of use of the machine.

Suitably supported, e. g. upon or near the end wall 13 and partition 17 are mounted bearings 22 wherein is journalled a shaft 23 which is driven by any suitable means here indicated typically by a gear 24. Fixedly mounted on the shaft 23 and spaced to lie on the sides nearer the charging end of the wall 13 and partitions 17 and 20 are hubs 25 which carry radiating arms 26. Attached to each arm 26 at the outer end thereof is a draining scoop indicated in general at 27. The specific construction of these scoops or buckets is shown in Figures 4, 5 and 6, wherein it will be seen that each bucket has a perforated floor 28 which is inclined rearwardly with respect to the direction of rotation as shown by the arrows in Fig. 2. At the outer side edge of the floor 28 is a side wall 29 of trapezoidal form and having the lesser of its parallel edges abutting the arm 26. The inner side edge of the bottom has an imperforate side wall 30 extending perpendicularly from the bottom. The side wall 30 is also of trapezoidal form but preferably is of less height than the wall 29. Between the smaller ends of the walls 29 and 30 extends an end wall 31 through which pass bolts 32 or the like for securing the bucket or scoop to the arm 26. The other end of the scoop is open and has its edges parallel to and close to the plane of the adjacent partition 17 or 20 or the wall 13.

Also, in each of the compartments 21 the shaft 23 carries a pair of spaced hubs 33 from which radiate arms 34 which are connected in pairs to paddle or stirrer blades 35. Longitudinally these blades 35 extend parallel and near to the wall 10 but the blades are inclined backwardly with respect to the direction of rotation to effect forcing the material away from the wall 10.

At the side of the wall 13 along which buckets 21 move upward there is provided a delivery chute 36. A supply pipe 37 feeds water into the machine adjacent the delivery end and the partitions 17 and 20 are each provided with a small slot 38 so that water entering from the pipe 37 can flow toward the charging end of the device while the small size of the slots 38 and their location near the tops of the partitions prevents any backward eddying of the water from the compartments nearer the charging end to those nearer the discharging end of the washer. An adjustable overflow pipe 39 is provided and this pipe leads from the compartment 16 to the exterior thereof. By this means the water in the washer is maintained at the desired height. Valved drain pipes 40 lead from the several compartments 21 and the well 18 so that the washer may be emptied for cleansing when found desirable.

In operation the washer is filled to the desired height with water from the pipe 37 and the water kept flowing so as to produce a flow from the discharging end to the charging end of the machine. Casein is supplied to the well 18 through the chute 19, the shaft 23 being constantly rotated. The buckets 27 of the first bucket wheel will pick up the casein since the front ends of the buckets are substantially closed during the time they traverse the partition 17. As the buckets successively rise out of the wash water the water entrained in the mass of granular casein will drain away through the perforations in the buckets. When these buckets rise, in the revolution of the bucket wheel, above the partition 17 they will discharge over the top of said partition into the first washing compartment 21. Here the action of the paddles or blades agitates the casein in the water.

The construction of the buckets 27 is designed to accomplish a number of useful functions. Picking up the casein in the lower part of the compartment, and raising this to the water level in the said compartment, will be fully understood. When the bucket approaches the water level, it contains a quantity of the wet, washed or partly washed casein in a loose, non-compact state, together with a considerable amount of the water in that compartment. This water will be less pure than the water in the next compartment, into which the casein is to be dumped, with as little as practically possible of the said dirty water.

As the bucket is raised out of the water, in a given compartment, the casein (being heavier than water) settles down, somewhat, in the bucket, thus forcing out some of the water, which runs back into the compartment. The action apparently is aided somewhat by the friction of the casein on the partition 20, and the fact that the bottom floor of the bucket 27 slopes downwardly towards the partition 20.

By the time the bucket is half way out of the water in that compartment, the mass of casein in that bucket has settled appreciably and by the time the bucket is out of this water, it will have so settled that the bucket carries a rather dense casein in its bottom, with substantially clear water above it. This clear water decants into the low side wall 30 (the side toward the rotary shaft) thus flowing back into the water in said compartment.

As the bucket continues to rise, and by the time it reaches the top of the partition 20, practically all the water carried in the interstices of the mass of casein in the bucket, will have flowed back into the compartment, and the free water on the top of the said mass of casein will have decanted back into the compartment.

During all of this period the casein has been getting denser.

When the bucket rises above the top edge of the partition 20, the dense casein, practically free from the dirty wash water, will slide out of the bucket into the next compartment.

I have referred above to washing cooked casein. This material can be kept, undried and only incompletely washed, for several days, perhaps a week, in hot summer weather, and for a longer time in cold weather, without substantial injury of the same.

The invention is also applicable to the washing of incompletely washed, acid precipitated casein, self-soured casein, or rennet casein, although it will be understood that the acid precipitated casein or self-soured casein while in a pressed condition containing around 60% of water will not keep very long. In some localities, it would be feasible to get this material from the pressing operation (in a small creamery), to the washing plant within one or two days. In such places it is entirely feasible to wash such casein by the present system. Rennet casein can be similarly handled.

There are also some cases where it would be entirely feasible to wash a dried casein which, on account of having not been properly and thoroughly washed before drying, would be considered as a low grade product.

The acid precipitated casein, self-soured casein, rennet casein or low grade dried casein can be washed in the manner stated above, with entirely satisfactory results.

A series of valved outlet pipes are provided, leading from the bottoms of the several compartments, for thoroughly washing out said compartments, after completion of a run.

When the cooked casein is received at the drying plant, in the condition above defined, it is first of all run through a picker or shredder, and the material reduced to a grain size of about ⅜ to ⅝ inch, and is then washed in the washer described above and is then dried. But the process is also applicable to much larger sized pieces of casein, e. g. chunks or pieces 6 x 3 x 3 inches in size have been washed clean by this process, in a wholly satisfactory manner.

What is claimed is:

1. In a washing machine, a trough-like body, a series of partitions extending across said body to divide the body into a series of washing compartments, said body having an intake end wall and a discharge end wall, a revolvable elevating wheel adjacent the discharge end wall, other revolvable elevator wheels adjacent the partitions on the intake side thereof, each of said wheels including a series of perforated buckets having each a bottom provided with oppositely disposed sides, said buckets having open ends, the bottoms and sides at the open end of each bucket having forward edges parallel to and traversing the respective partitions during the lower portion of its revolving movement and open for the delivery of material upon movement above the partitions and discharge end wall, the bottoms of the buckets being inclined forwardly and downwardly when in positions with the forward edges of the buckets level with the upper edges of the partitions and discharge end wall, and means to rotate said wheels.

2. In a washing machine, a trough-like body, a series of partitions extending across said body to divide the body into a series of washing compartments, said body having an intake end wall and a discharge end wall, a revolvable elevating wheel adjacent the discharge end wall, other revolvable elevator wheels adjacent the partitions on the intake side thereof, each of said wheels including a series of perforated buckets having each a bottom provided with oppositely disposed sides, said buckets having open ends, the bottoms and sides at the open end of each bucket having forward edges parallel to and traversing the respective partitions during the lower portion of its revolving movement and open for the delivery of material upon movement above the partitions and discharge end wall, the bottoms of the buckets being inclined forwardly and downwardly when in positions with the forward edges of the buckets level with the upper edges of the partitions and discharge end wall, means to rotate said wheels, a perforated wall between the intake end wall and the adjacent partition to provide an intake well and an overflow chamber, an overflow pipe leading from said overflow chamber to the exterior of the body, and a supply pipe leading to the discharge end of the body.

3. In a washing machine, a trough-like body, a series of partitions extending across said body to divide the body into a series of washing compartments, said body having an intake end wall and a discharge end wall, a revolvable elevating wheel adjacent the discharge end wall, other revolvable elevator wheels adjacent the partitions on the intake side thereof, each of said wheels including a series of perforated buckets having each a bottom provided with oppositely disposed sides, said buckets having open ends traversing the respective partitions during the lower portion of its revolving movement and open for the delivery of material upon movement above the partitions and discharge end wall, each of said buckets having its bottom inclined with respect to the plane of revolution of the respective wheel to slant downwardly from the wheel as the bucket rises above the level of the partition top, and means to rotate said wheels.

4. In a washing machine, a trough-like body, a series of partitions extending across said body to divide the body into a series of washing compartments, said body having an intake end wall and a discharge end wall, a revolvable elevating wheel adjacent the discharge end wall, other revolvable elevator wheels adjacent the partitions on the intake side thereof, each of said wheels including a series of perforated buckets having each a bottom provided with oppositely disposed sides, said buckets having open ends traversing the respective partitions during the lower portion of its revolving movement and open for the delivery of material upon movement above the partitions and discharge end wall, each of said buckets having its bottom inclined with respect to the plane of revolution of the respective wheel to slant downwardly from the wheel as the bucket rises above the level of the partition top, means to rotate said wheels, a perforated wall between the intake end wall and the adjacent partition to provide an intake well and an overflow chamber, an overflow pipe leading from side overflow chamber to the exterior of the body, and a supply pipe leading to the discharge end of the body.

5. In a washing machine, a trough-like body, a series of partitions extending across said body to divide the body into a series of washing compartments, said body having an intake end wall and a discharge end wall, a revolvable elevating wheel adjacent the discharge end wall, other revolvable elevator wheels adjacent the partitions on the intake side thereof, each of said wheels including a series of perforated buckets having each a bottom provided with oppositely disposed sides, said buckets having open ends, the bottoms and sides at the open end of each bucket having forward edges parallel to and traversing the respective partitions during the lower portion of its revolving movement and open for the delivery of material upon movement above the partitions and discharge end wall, the bottoms of the buckets being inclined forwardly and downwardly when in positions with the forward edges of the buckets level with the upper edges of the partitions and discharge end wall, means to rotate said wheels, a perforated wall between the intake end wall and the adjacent partition to provide an intake well and an overflow chamber, an overflow pipe leading from said overflow chamber to the exterior of the body, and a supply pipe leading to the discharge end of the body, said partitions being provided with flow openings adjacent their upper edges.

6. In a washing machine, a trough-like body, a series of partitions extending across said body to divide the body into a series of washing compartments, said body having an intake end wall and a discharge end wall, a revolvable elevating wheel adjacent the discharge end wall, other revolvable elevator wheels adjacent the partitions on the intake side thereof, each of said wheels including a series of perforated buckets having each a bottom provided with oppositely disposed sides, said buckets having open ends traversing the respective partitions during the lower portion of its revolving movement and open for the delivery of material upon movement above the partitions and discharge end wall, each of said buckets having its bottom inclined with respect to the plane of revolution of the respective wheel to slant downwardly from the wheel as the bucket rises above the level of the partition top, means to rotate said wheels, a perforated wall between the intake end wall and the adjacent partition to provide an intake well and an overflow chamber, an overflow pipe leading from side overflow chamber to the exterior of the body, and a supply pipe leading to the discharge end of the body, said partitions being provided with flow openings adjacent their upper edges.

HUGH P. FELL.